United States Patent [19]

Laurenson, Jr.

[11] 4,410,349

[45] Oct. 18, 1983

[54] COMPOST AIR INJECTION AND EVACUATION SYSTEM

[76] Inventor: John G. Laurenson, Jr., 5480 Rivertrail Rd. S., Jacksonville, Fla. 32211

[21] Appl. No.: 364,003

[22] Filed: Mar. 31, 1982

[51] Int. Cl.³ .......................................... C05F 11/08
[52] U.S. Cl. ........................................ 71/9; 210/623
[58] Field of Search ......................... 71/9, 11, 12, 23; 210/620, 621, 623, 323.2; 162/60

[56] References Cited

U.S. PATENT DOCUMENTS

| | | |
|---|---|---|
| 2,867,521 | 1/1959 | Jeffreys . |
| 2,897,601 | 8/1959 | Hulton . |
| 3,114,622 | 12/1963 | Hardy . |
| 3,323,896 | 6/1967 | Brown . |
| 3,357,812 | 12/1967 | Snell . |
| 3,540,837 | 11/1970 | Pascucci . |
| 3,756,784 | 9/1973 | Pittwood . |
| 3,895,916 | 7/1975 | Rosner . |
| 3,960,537 | 6/1976 | Kaelin . |
| 4,062,770 | 12/1977 | Kneer . |
| 4,146,381 | 3/1979 | Willisch . |
| 4,163,724 | 8/1979 | Muller et al. ............... 210/323.2 |
| 4,203,755 | 5/1980 | Ruckstuhl . |
| 4,226,832 | 10/1980 | Roumens . |
| 4,228,241 | 9/1981 | Shelef . |
| 4,236,910 | 12/1980 | Norin . |

*Primary Examiner*—Ferris H. Lander
*Attorney, Agent, or Firm*—Winburn & Gray, Ltd.

[57] ABSTRACT

The present invention provides a method and apparatus for economical and efficient composting. The apparatus includes a manifold with lances coupled thereto for even fluid distribution throughout the compost. The manifold is designed to direct fluid flow to a portion of the lances while simultaneously removing fluid flow from the other portion of lances. This creates substantially uniform patterns of fluid injection and evacuation for uniform composting, reduced energy requirements and greater control of process conditions. Further, reversal of the fluid flow enhances control of process conditions and adds an automatic self cleaning aspect to the apparatus.

10 Claims, 4 Drawing Figures

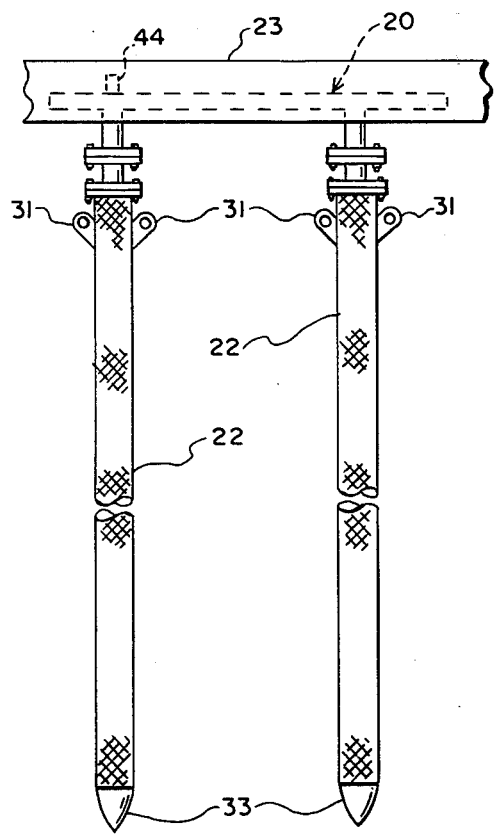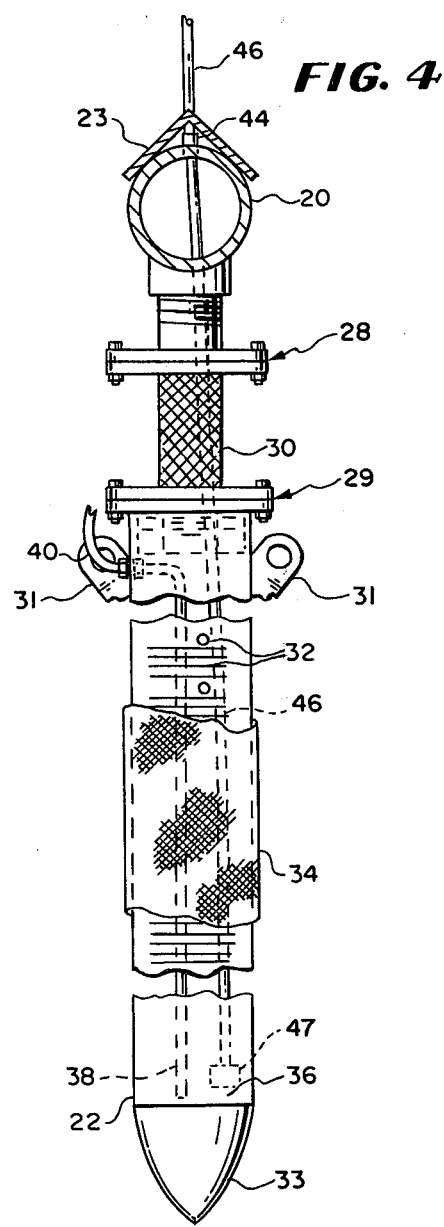

COMPOST AIR INJECTION AND EVACUATION SYSTEM

BACKGROUND OF THE INVENTION

The present invention relates to a new and improved method and apparatus for composting. More particularly, the invention relates to an improved compost air distribution method and system in compost pile reactors.

It has long been recognized that vast quantities of organic waste materials are being produced annually. As the world's population increases so does its capacity to produce waste materials. The disposal of these waste materials represent difficult disposal problems. Their disposal takes up valuable land, and monopolizes large amounts of time, energy, effort and capital to overcome the burden of the ever increasing quantities of organic waste material.

Composting provides an important part of the solution to reduce the problems associated with organic waste material disposal. Further, composting can provide materials that serve as important basic building block materials for such industries as the construction industry and the agriculture industry.

Composting for the most part is a time consuming, energy intensive, non uniform process. Various composting apparatus and methods are shown in U.S. Pat. Nos. 3,114,622; 3,357,812; and 4,203,755.

U.S. Pat. No. 3,114,622, issued Dec. 17, 1963 to W. Hardy, discloses an apparatus utilized as a waste material converter. The converter includes a plurality of screw augers having holes therein for the introduction of air into the waste pile. U.S. Pat. No. 3,357,812, issued Dec. 12, 1967 to J. R. Snell, discloses an apparatus for composting organic waste material utilizing a fixed pipe system located beneath the composting pile for accomplishing reversible air flow. U.S. Pat. No. 4,203,755, issued May 20, 1980 to K. Ruckstuhl, discloses an apparatus for treating waste material wherein a plurality of pipes are disposed within the composting mass for the discharge of gaseous products of decomposition.

The present invention provides a device that equalizes air distribution throughout the compost pile. This equalization reduces air pressure thereby reducing horsepower, and the associated energy to generate the required air distribution. The air distribution equalization enhances process controls and removes or inserts moisture in the system, as desired to improve the composting efficiency. Further, the present invention reduces the overall length of the process air path to prevent compost pile hot spots and dead spots to provide a more uniform composting process.

SUMMARY OF THE INVENTION

The present invention provides a new and improved method and apparatus for the composting of organic waste material. The new composting apparatus includes a manifold system coupled to a plurality of lances for even fluid or air distribution throughout the compost mass. The new composting apparatus achieves a more uniform composting process, with less power requirements in a shorter time. Also, the apparatus is readily adaptable to various sized and shaped compost containment structures, and various compost process requirements. Further, the apparatus is easily maintained and cleaned.

The composting apparatus of the present invention includes a plurality of lances coupled to the manifold system for the injection and evacuation of fluid or air flow in distinct substantially uniform injection and evacuation patterns substantially equally spaced from one another. The manifold defines the injection and evacuation patterns in a substantially vertical plane, while the lances define the patterns in a horizontal plane.

The injection and evacuation patterns of fluid or air flow reduces the length of the process fluid path. This reduces the overall system pressure drop. It also reduces the possibility of short circuiting which causes hot spots and dead spots in the composting mass and adds to the uniformity of the composting process. Further, due to the pressure drop less horsepower is required to drive the fluid through the system and therefore less energy is required.

The manifold and lances are sized and arranged in accordance with the requirements of the mass to be composted as well as the size and shape of the compost containment structure. This adds flexibility and adaptability to the system. Also, preferably the manifold is supported over the compost pile with an over head suspension and the lances are coupled to the manifold by bolt and flange connections. This facilitates the use of front end loaders without risking damage to the apparatus as in a permanent installation.

The lances of the apparatus are made from stainless steel or any non-corrosive easily cleanable material. Orifices are placed along the body of the lance to maintain the uniform pattern at the various levels. The orifices are sized per process condition requirements. A screen or woven cover is fitted around each lance to facilitate cleaning and maintenance.

The lances are also fitted with a well at their lower ends. The well collects moisture that condenses inside the lance. A moisture evacuation system removes the condensate within the lance by a removal pipe connected to an evacuator. The lances also can be utilized to inject moisture as desired.

In addition to the easily maintainable and cleanable aspects of the apparatus and its adaptability to various process conditions, the apparatus is designed to either manually or automatically reverse fluid or air flow. By reversing the fluid flow of the apparatus the lances are benifited by a self-cleaning action. Further, the reversal of fluid flow allows greater process control for more uniform composting.

BRIEF DESCRIPTION OF THE DRAWINGS

FIG. 3 is a partial fragmentary elevational view of a portion of the present invention.

FIG. 4 is a partial fragmentary elevational view of another portion of the present invention.

DETAILED DESCRIPTION OF THE DRAWINGS

Figure 1:
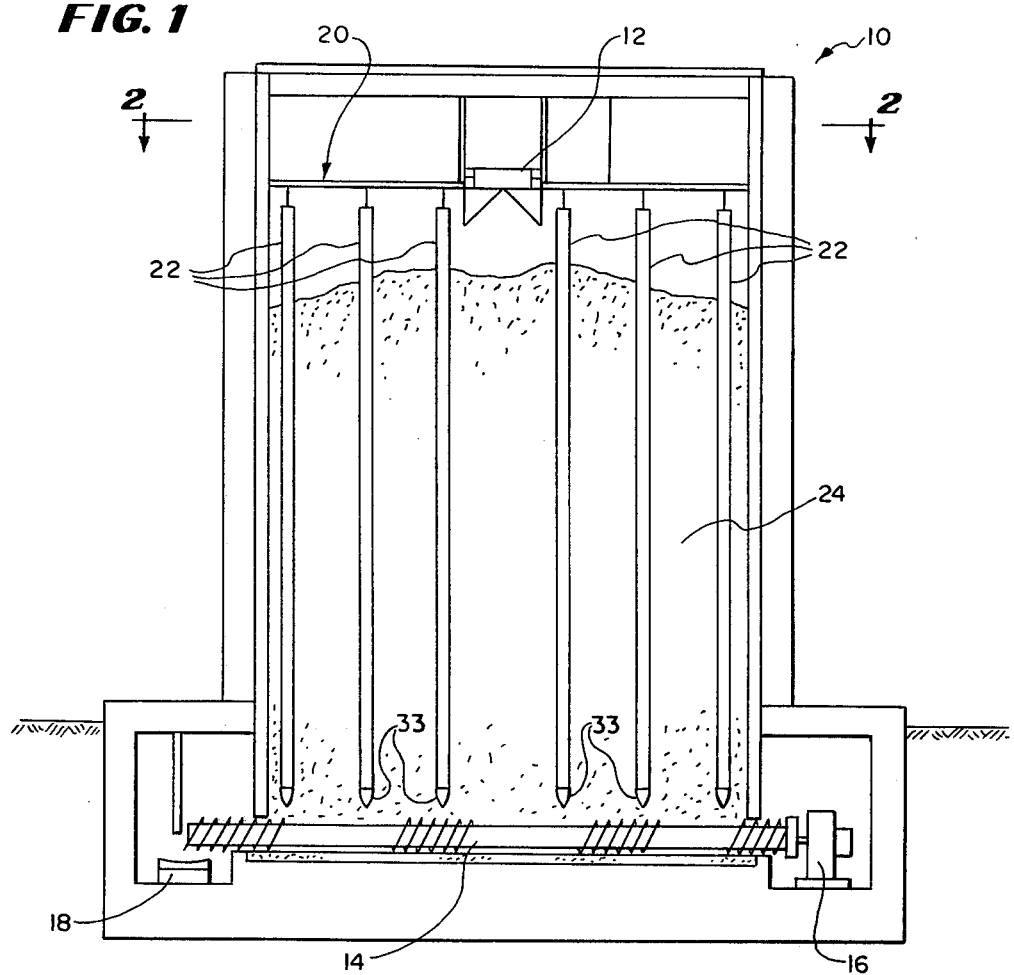
FIG. 1 is a vertical sectional view of a processing structure embodying the present invention.

Referring now to FIG. 1, there is illustrated a containment structure 10 housing the fluid or air distribution system of the present invention. The containment structure 10 receives material to be composted by an infeed conveyor and distributor 12, located near the upper portion of the structure 10. Once composted the finished product is discharged near the bottom portion of the containment structure 10 by a discharge screw 14 driven by a suitable drive system 16. The finished product is discharged onto a discharge conveyor 18 adapted to carry the material to loading and handling facilities for further processing or shipping.

The containment structure 10 as depicted in FIG. 1 is basically rectangular in configuration; however the air distribution system of the present invention incorporates adaptability and flexibility so as to be utilized in containment structures of various sizes and shapes, such as circular structures, and A-frame structures, for example. Further, the air distribution system of the present invention may also be used in open pile compost arrangements.

The fluid or air distribution system of the present invention includes a manifold 20 for directing fluid flow towards and away from a plurality of lances 22. The manifold 20 is situated near the upper end portion of the containment structure 10 and is suspended in a substantially horizontal plane with the aid of structural supports 23. The lances 22 are coupled to the manifold 20 at various points along its length and project downward into the compost pile 24.

Figure 2:
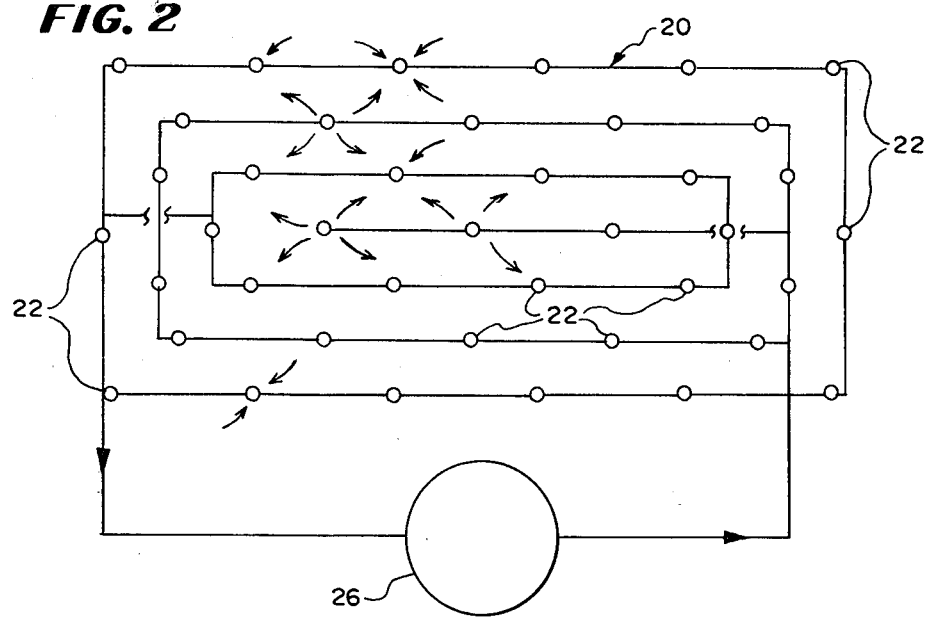
FIG. 2 is a section taken along line 2—2 of FIG. 1.

The manifold 20 is constructed so as to deliver fluid flow to a portion of the lances 22 while simultaneously removing fluid flow from the other portion of the lances 22. This is best seen in FIG. 2 wherein the manifold 20 is constructed to deliver a fluid flow to a portion of the lances 22 to create a uniform pattern of fluid injection into the compost pile 24 while simultaneously creating a uniform pattern of fluid evacuation from the compost pile 24 through the remaining portion of the lances 22. The manifold 20 is connected to an air handler or blower 26 for suitable creation of the aforesaid fluid flow.

The uniform patterns hereinabove discussed are designed to reduce the length of the process fluid path through the compost pile 24. This reduction in length reduces the overall system pressure drop which reduces the pressure needed to circulate the fluid. Less fluid pressure means less horsepower required which translates into a substantial energy savings.

Further, the uniform fluid patterns decrease the possibility of short circuiting which causes reactor hot spots and dead spots which create non-uniformity of processing in the compost pile. Also the uniform fluid patterns lend a greater ability to control process conditions for greater efficiency in composting.

The air handler 26 is adapted to either manually or automatically, attendant to sensed process conditions or programmed timing sequence, reverse the fluid flow in the manifold. The fluid flow reversal changes the fluid flow within the compost pile 24, but still maintains substantially uniform patterns of fluid injection and fluid evacuation. This fluid flow reversal further allows greater control over the composting operation to reduce composting time and obtain a more uniform end product.

The lances 22 can best be seen in FIGS. 3 and 4. In FIG. 4 the lance 22 is coupled to the manifold 20 by bolt and flange arrangements 28 and 29 or any similar quick disconnect arrangement and a reinforced hose 30. The bolt and flange arrangements 28 and 29 allow fast and easy connection and removal of the lances 22 from the manifold 20. This arrangement facilitates cleaning, maintenance and replacement while lending strength to the connection. The reinforced hose 30 allows the lances 22 which are suspended vertically within the compost pile 24 without bottom attachment, freedom of movement to allow the use of front end loaders within the containment structure without damage to lances 22 contacted thereby. The lances 22 have lifting eyes 31 connected at their upper end portions and driving points 33 connected at their lower end portions for the ease of removal/insertion of the lances into the compost pile.

The lance 22 is made of an easily cleanable, non-corrosive material such as stainless steel or the like, for example. The lance 22 includes a pattern of orifices 32 along its length for the introduction and evacuation of fluid into the compost pile 24. The lance 22 is covered with a fine mesh screen or cloth 34 such as Teflon ® screen, or Teflon ® woven cloth for the like, for example. The screen 24 further facilitates cleaning and maintenance of the lances 22. Also, fluid flow reversal provides for automatic self cleaning of the lances 22.

Lance length, lance spacing, as well as the pattern and size of orifices in the lance are dictated by the compost characteristics, and air flow requirements. Further the size and shape of the containment structure dictates the size of the lances. For example, in an A-Frame containment structure manifolds will be placed at various levels to accomodate the sloping sides to maintain uniform patterns of fluid flow out of edges of the structure. This will also necessitate different lengths of lances which can be formed in interconnecting segments. In an open pile compost arrangement the material to be composted is in a mound form with the mound being higher at the middle portion than at its outer end portions. This type of arrangement dictates shorter lances at the outer end portions and longer lances in the middle portion.

Turning again to FIG. 4 it can be seen that the lance 22 includes at its lower end portion a receptacle 36 for the collection of moisture from the compost. The moisture is removed from the lance by a line 38 within the lance 22. The line 38 is coupled to an evacuation system (not shown) by means of a flexible coupling 40. Alternately, as compost process conditions dictate, moisture could be injected into the compost mass by the lances 22 utilizing line 38, receptacle 36 and reversing the evacuation system.

It is contemplated that the lances 22 are to be fitted with process analyzing probes. These probes will monitor temperature, moisture, and pressure to further enhance process control for a more efficient and uniform compost. An example of such a probe is shown in FIG. 4. Probe 47 is disposed within the interior of the lance 22 through connector 44 connected to the manifold 20. The probe 47 senses process conditions and transmits the information through conduit 46 to an analyzer or controller (not shown).

The air distribution system of the present invention provides uniform patterns of fluid injection and evacuation in a compost pile. These patterns reduce the process fluid path which reduces fluid pressure, and reduces horsepower which in turn lessens energy consumption. The reversing of the fluid flow in the air distribution system provides greater controlling of process conditions to provide a more uniform compost pile by negating the cooling effect of fluid injection in one area which tends to produce dead spots, i.e. non-composting areas. The reversing of fluid flow also provides an automatic self-cleaning system. Also, moisture control of the compost pile is enhanced by this system.

Modifications and variations by the present invention are possible in light of the above teachings. For example, it is possible to mount the manifold 20 below the compost pile 24 and have the lances 22 project upward into the compost pile 24. It is therefore, to be understood that within the scope of the appended claims the invention may be practiced otherwise than as specifically described.

I claim:

1. A method for treating compost, comprising:
   injecting a fluid flow into the compost in a first substantially uniform pattern through a plurality of lances through at least one fluid flow passageway in each lance;
   evacuating the fluid from the compost in a second substantially uniform pattern, substantially equally spaced from said first pattern through a second plurality of lances through at least one fluid flow passageway in each lance;
   directing the fluid flow towards and away from said lances through manifold means coupled to the fluid flow passageways in said lances, said manifold means defining said first and second substantially uniform patterns in a substantially vertical plane with respect to the compost; and
   coupling said lances to said manifold means to define said first and second substantially uniform patterns in a plane substantially perpendicular to said substantially vertical plane, at least some of said lances include a pattern of orifices spaced along the length thereof coupled to said passageway providing access for fluid flow to and from the compost and placing said pattern of orifices along the length of the lances in accordance with the compost requirements.

2. The method as defined in claim 1 wherein said fluid flow is reversed so that said fluid flow is evacuated from said compost in said first substantially uniform pattern; and
   said fluid flow is injected into said compost in said second substantially uniform pattern, substantially equally spaced from said first pattern.

3. The method as defined in claim 2 wherein said fluid flow is alternated manually.

4. The method as defined in claim 2 wherein said fluid flow is alternated automatically attendant to a change in pressure within the compost.

5. The method as defined in claim 2 wherein said fluid flow is alternated automatically attendant to a preset sequence.

6. The method as defined in claim 2 wherein said fluid flow is alternated to self-clean said plurality of lances.

7. The method as defined in claim 1 wherein moisture is injected into said compost.

8. The method as defined in claim 1 wherein moisture is automatically injected into said compost attendant to changes of temperature and moisture content within the compost.

9. The method as defined in claim 1 wherein moisture is automatically injected into said compost attendant to changes of temperature and moisture content within the compost through said lances.

10. The method as defined in claim 1 wherein moisture is removed from said compost attendant to changes in moisture content within said compost.

* * * * *